United States Patent
Carey et al.

(10) Patent No.: US 6,777,489 B1
(45) Date of Patent: Aug. 17, 2004

(54) AQUEOUS POLYMER DISPERSION

(75) Inventors: Michelle Jocelyn Carey, Prahran (AU); Matthew William Carr, Prahran (AU); Patrick William Houlihan, Greenwich (AU); Bruce Leary, Port Melbourne (AU); Christopher Henry Such, Mount Eliza (AU); Thamala C Weerasinghe, Narre warren (AU)

(73) Assignee: Orica Australia PTY Ltd., Victoria (AU)

( * ) Notice: Subject to any disclaimer, the term of this patent is extended or adjusted under 35 U.S.C. 154(b) by 0 days.

(21) Appl. No.: 10/030,916

(22) PCT Filed: Jul. 13, 2000

(86) PCT No.: PCT/AU00/00844

§ 371 (c)(1),
(2), (4) Date: May 22, 2002

(87) PCT Pub. No.: WO01/05844

PCT Pub. Date: Jan. 25, 2001

(30) Foreign Application Priority Data

Jul. 14, 1999 (AU) .............................................. PQ1642

(51) Int. Cl.$^7$ .................................................. C08F 2/16
(52) U.S. Cl. ...................................... 524/800; 524/845
(58) Field of Search ................................. 524/800, 845

(56) References Cited

U.S. PATENT DOCUMENTS

| | | | |
|---|---|---|---|
| 4,268,641 A | 5/1981 | Koenig et al. | |
| 4,351,754 A | 9/1982 | Dupre | |
| 4,384,096 A | 5/1983 | Sonnabend | |
| 4,468,498 A | 8/1984 | Kowalski et al. | |
| 4,600,761 A | 7/1986 | Ruffner et al. | |
| 4,616,074 A | 10/1986 | Ruffner | |
| 4,617,343 A | 10/1986 | Walker et al. | |
| 5,011,978 A | 4/1991 | Barron et al. | |
| 5,229,209 A | 7/1993 | Gharapetian et al. | |
| 5,256,724 A | 10/1993 | Biale | |
| 5,266,646 A | 11/1993 | Eisenhart et al. | |
| 5,326,814 A | 7/1994 | Biale | |
| 5,480,934 A | 1/1996 | Messner et al. | |

FOREIGN PATENT DOCUMENTS

| | | |
|---|---|---|
| DE | 19629926 A1 | 1/1997 |
| EP | 0161104 | 11/1985 |
| EP | 0670333 A2 | 9/1995 |
| EP | 0705852 A1 | 4/1996 |
| EP | 0705854 A1 | 4/1996 |
| EP | 0729989 A2 | 9/1996 |
| EP | 0736546 A2 | 10/1996 |
| EP | 0979833 A2 | 2/2000 |
| GB | 2303632 A | 2/1997 |
| WO | WO 93/24544 | 12/1993 |
| WO | WO 95/00565 | 1/1995 |
| WO | WO 97/08212 | 3/1997 |

Primary Examiner—Kriellion A. Sanders
(74) Attorney, Agent, or Firm—Pillsbury Winthrop LLP

(57) ABSTRACT

This invention relates to a process for preparing an aqueous dispersion of water insoluble polymer particles comprising: a) preparing by polymerisation an aqueous dispersion of water insoluble particles of a heteropolymer including monomeric units of a reactive amphiphile having a cloud point and monomeric units of a hydrophilic monomer, said polymerisation being conducted in the presence of a stabilising agent and the reactive amphiphile and at a temperature above the cloud point of said amphiphile, and b) cooling said aqueous dispersion to a temperature below the cloud point of the reactive amphiphile such that the viscosity of the aqueous dispersion increases. The invention also relates to aqueous dispersions of water insoluble heteropolymer particles which incorporate units of reactive amphiphile.

27 Claims, No Drawings

AQUEOUS POLYMER DISPERSION

CROSS REFERENCE TO RELATED APPLICATIONS

This application is the National Phase of International Application No. PCT/AU00/00844, filed Jul. 13, 2000, which designated the United States, and which further claims priority from Australian Patent Application No. PQ 1642, filed Jul. 14, 1999. The priority applications are incorporated herein by reference.

This invention relates to the production and use of aqueous dispersions of water insoluble heteropolymeric particles. In particular it relates to the incorporation of reactive amphiphilic moieties into such polymeric particles to provide aqueous dispersions exhibiting a temperature dependent viscosity. The invention also relates to the use of these aqueous dispersions as binders or thickeners for paints, adhesives, textile coatings, carpet backings and construction materials. The aqueous dispersions are particularly useful in the preparation of paints and accordingly it will be convenient to hereinafter describe the invention with reference to this application, however it is to be understood that the aqueous dispersions have other applications.

U.S. Pat. No. 4,468,498 (Kowalski) describes a sequential emulsion polymerisation process for making an aqueous dispersion of water insoluble heteropolymeric particles having a core/sheath (or shell) structure. The core, which contains acid monomers, is alkali swellable such that addition of base to the polymerised particles to neutralise the acid monomers results in hydration of the core and swelling of the particles. The swelling allows the aqueous dispersion to be used as a thickener for water based coating compositions. It is also suggested that the dispersion could be used as a binder or part thereof in a water based coating composition.

It has now been found that the incorporation of a reactive amphiphile into a water insoluble heteropolymer during polymerisation and under particular conditions can enhance the thickening of an aqueous dispersion of the heteropolymer and provide an aqueous dispersion exhibiting a temperature dependent viscosity.

Accordingly in a first aspect the present invention provides a process for preparing an aqueous dispersion of water insoluble polymer particles comprising:

a) preparing by polymerisation an aqueous dispersion of water insoluble particles of a heteropolymer including monomeric units of a reactive amphiphile having a cloud point and monomeric units of a hydrophilic monomer, said polymerisation being conducted in the presence of a stabilising agent and the reactive amphiphile and at a temperature above the cloud point of said amphiphile, b) cooling said aqueous dispersion to a temperature below the cloud point of the reactive amphiphile such that the viscosity of the aqueous dispersion increases.

As used herein the term "cloud point" refers to the temperature at which the molecules of reactive amphiphile disassociate from the water molecules with which they are hydrated to the extent that they form a separate phase. In the absence of monomers this event results in a separation of an aqueous solution of the amphiphile into two phases, one being a phase rich in surfactant and the other being an aqueous equilibrium mixture in which relatively little surfactant is present. This phase separation causes a clear solution of the amphiphile to become cloudy, hence the term "cloud point". In the emulsion polymerisation process of the present invention it is believed that this event results in the amphiphile becoming associated with and embedded in the oil phase of the emulsion.

Many factors effect the cloud point of an amphiphile. Several of these factors are described in Chapter 11 of Nonionic Surfactants Chemical Analysis Vol. 19 Surfactant Science series, edited John Cross, published by Marcel Dekker, Inc. 1987 which is incorporated herein by reference.

While the exact temperature at which the amphiphile dissociates from its water of hydration in the emulsion polymerisation medium is difficult to measure, it can be approximated by measuring the cloud point of the amphiphile in an aqueous composition similar to the aqueous phase of the emulsion. As indicated in Chapter 11 of the reference above it is possible to lower the cloud point of an amphiphile by changing the composition of the aqueous phase. For example it is possible to change the cloud point of an amphiphile by addition of electrolytes, such as those based on alkali metal ions. Addition of such electrolytes generally causes a depression of the cloud point which can be quite marked.

The term "cloud point" is normally only applicable to nonionic amphiphiles, however some ionic surfactants also have a cloud point at a pH at which the surfactants are uncharged. For example anionic surfactants, such as phosphates, sulfonates or carboxylates, may have a cloud point at a pH below the pKa of the phosphate or carboxylate. Similarly cationic surfactants, such as primary and secondary amine surfactants, may have a cloud point at a pH above the pKb of the amine group.

The reactive amphiphile may be any amphiphilic compound having a cloud point and being capable of being incorporated into the heteropolymer. The amphiphile may be incorporated into the "backbone" of the heteropolymer or the amphiphile may become incorporated into the heteropolymer by reacting with functional groups present on the "backbone" monomers.

Examples of reactive amphiphiles capable of being incorporated into the backbone of the heteropolymer include surfactants having one or more polymerisable double or triple bonds, such as the unsaturated fatty acid and fatty alcohol alkoxylates and surfactants containing reactive double bonds derived from (meth)acryl or vinyl groups. Examples of reactive amphiphiles derived from unsaturated fatty acids and alcohols include undecylenic acid ethoxylate, undecylenol ethoxylate, linoleyl acid ethoxylate, linoleyl alcohol ethoxylate and octenol ethoxylate. Examples of commercially available materials which contain unsaturation derived from (meth)acryl or vinyl groups, and which have suitable cloud point characteristics are Blemmer 70PEP-350B (NOF Corp.) and Emulsogen R109 (Clariant). The reactive amphiphile may include block copolymers of propoxylate, ethoxylate and/or butoxylate with a reactive group or may be an ethoxylated alcohol or acid with propylate or butoxylate attached. These amphiphiles generally become incorporated into the heteropolymer by free radical mechanisms.

Examples of reactive amphiphiles capable of reacting with a functional group of a backbone monomer include those unsaturated amphiphiles described above, as well as amphiphiles having reactive groups, such as carboxylates, sulfonates, phosphates, primary or secondary amino and other groups known to those skilled in the art as being capable of reacting with the backbone monomers (whether before or after incorporation into the heteropolymer) under the polymerisation conditions employed. The amphiphile used in a particular polymerisation will depend on the nature of the functional groups present on the backbone monomers.

Examples of reactive amphiphiles capable of reacting with a functional group of a backbone monomer include phosphates, such as stearyl ethoxylate phosphate or carboxylates, such as alkylsuccinic anhydride ethoxylate, and polyether amines, such as Jeffamine M2070. Any of these amphiphiles may be employed provided the polymerisation medium is such that the amphiphile has a cloud point.

Examples of backbone monomers which include functional groups capable of reacting with such reactive amphiphiles include glycidyl methacrylate or acrylate, acetyl acetoethylmethacrylate, or isocyanate containing monomers such as 2-isocyantoethyl methacrylate. A person skilled in the art would be able to readily determine combinations of reactive groups on amphiphiles and reactive groups on backbone monomers which would allow incorporation of the reactive amphiphile into the heteropolymer.

The reactive group of the amphiphile may be present in either the hydrophobic or the hydrophilic region of the amphiphile.

The exact nature of the amphiphile employed will depend on several factors, the most important of which is the cloud point. Accordingly the degree of alkoxylation, the width of the alkoxylate distribution or other structural features of a given amphiphile are less critical than the cloud point of the resulting amphiphile in the polymerisation medium employed.

Preferably the amphiphile has a cloud point of at least 10° C. above the normal use temperature of the water-based composition or paint. Accordingly the amphiphile preferably has a cloud point of greater than 45° C., more preferably above 50° C. and most preferably between 50° C. and 100° C.

The amount of amphiphile employed will also depend on several factors, including the desired end use of the dispersion, however the amount of amphiphile will preferably be from 1–35%, more preferably 3 to 15% by weight of the heteropolymer.

An important characteristic of the amphiphile is that it be reactive and hence capable of incorporation into the core polymer. Although the amphiphile is designed to be reactive it is not essential that 100% is combined under the conditions of the polymerisation. The family of ethoxylated amphiphiles derived from the Ocenol hydrophobe is particularly useful in the present invention. In this case the hydrophobe contains a mixture of mono-unsaturated (oleyl) and di-unsaturated (linoleyl) units. The linoleyl fraction is more readily reactive and a minimum of 20% of this entity can be shown to become incorporated into the polymer during polymerization.

The term "hydrophilic monomers" as used herein refers to monomers which have a solubility in water of at least 5 g/L. Examples of suitable hydrophilic monomers include methyl methacrylate, ethyl acrylate, vinyl acetate, methyl acrylate, acrylic acid, methacrylic acid, propyl acrylate, isopropyl methacrylate, hydroxy ethyl methacrylate, hydroxy propyl methacrylate, acrylamide and methacrylamide. Other examples of water soluble monomers would be known to those skilled in the art. The hydrophilic monomers preferably make up 5 to 99%, more preferably 60 to 95% by weight of the heteropolymer.

In a preferred embodiment at least a portion of the hydrophilic monomers have ionizable groups. The ionizable groups may be acid groups or basic groups. Examples of suitable acid monomers include methacrylic acid, acrylic acid, itaconic acid, p-styrene carboxylic acids, p-styrene sulfonic acids, vinyl sulfonic acid, vinyl phosphonic acid, ethacrylic acid, alpha-chloroacrylic acid, crotonic acid, fumaric acid, citraconic acid, mesaconic acid and maleic acid. Examples of readily available basic monomers include 2-(dimethyl amino) ethyl and propyl acrylates and methacrylates, and the corresponding 3-(diethylamino) ethyl and propyl acrylates and methacrylates. Alternatively, the required basic groups could be formed in situ by post reaction of such functional monomers such as glycidyl methacrylate with a suitable amine co-reactant, typically a secondary amine. Preferably the ionizable monomers make up 0.1 to 40%, more preferably between 1 and 20% and most preferably 1 to 10% by weight of the heteropolymer.

In addition to the hydrophilic monomers the heteropolymer may contain some hydrophobic monomers having a water solubility less than 5 g/L. The presence of hydrophobic monomers may reduce the ability of the dispersion to thicken. It may be possible to compensate for this effect of the hydrophobic monomers, for example, by increasing the proportion of ionizable monomers or hydrophilic groups. The presence of hydrophobic monomers can contribute to the film properties of a resultant coating. Examples of less soluble monomers which may be incorporated into the heteropolymer include styrene, alpha-methyl styrene, butyl acrylate, butyl methacrylate, amyl methacrylate, hexyl methacrylate, lauryl methacrylate, stearyl methacrylate, ethyl hexyl methacrylate, crotyl methacrylate, cinnamyl methacrylate, oleyl methacrylate, ricinoleyl methacrylate, vinyl butyrate, vinyl tert-butyrate, vinyl stearate, vinyl laurate etc. Preferably these less soluble monomers make up less than 75% by weight, more preferably less than 45% and most preferably less than 10% of the heteropolymer.

The monomers may be utilised in monomeric form or in the form of prepolymers. For example the acid monomers may be added in prepolymerised form, either in the form of a pre-homopolymer or as a pre-copolymer with one or more of the hydrophilic monomers.

The monomer composition may further include monomers with more than one reactive group as crosslinking agents. Examples of suitable polyfunctional monomers include glycerol propoxy triacrylate, glycerol propoxy trimethacrylate, ethylene glycol dimethacrylate, trimethylolpropane triacrylate and trimethylolpropane trimethacrylate. The crosslinking agent may be added in an amount of 0 to 10%, more preferably 0.001 to 4% by weight of the heteropolymer.

Alternative methods of providing controlled crosslinking may be incorporating an appropriate concentration of functional monomers typically used by persons skilled in the art. Such monomers include, 2-isocyantoethyl methacrylate, N-methyl acrylamide, and glycidyl methacrylate or acrylate. Such functional monomers would be designed to react completely with an appropriate complementary coreacting functional monomer such as acid monomer, hydroxy monomer, or combinations. A wide range of crosslinking reactions are possible.

While not wishing to be limited by theory it is believed that conducting the polymerisation at a temperature above the cloud point allows the reactive amphiphile to become embedded in the particles at a temperature above its cloud point. It is also believed that ionizable monomers can play a role in embedding the amphiphile in the particles by associating with the hydrophilic portion of the amphiphile, such as with the polyoxyalkylene segments present in alkoxylated surfactants. As the particles cool it is believed that the amphiphile becomes more hydrated, thereby causing the particles to swell and resulting in thickening of the dispersion. This thickening is greatly enhanced by addition of a suitable neutralising agent which neutralises the ionizable monomer units causing further swelling of the particles.

A common requirement within the typical formulating practices for waterborne latex based products is that they rely on the use of theological additives and other modifiers to a much greater extent than their solvent based counterparts. Depending on the end use, a typical latex paint might contain four or five different additives to provide the balance of viscosities required for application, anti-settling and flow characteristics and to optimise film formation.

Within the group of theological control additives, one class are the so called alkali swellable acrylic thickeners (ASA), which are acid containing acrylic latex copolymers. When neutralised with ammonia, such materials become thick, viscous liquids. These materials rely on relatively high levels of acid monomers to achieve their thickening effects and are sensitive to other formulation ingredients. Thickening function can be reduced in the presence of co-solvent hence requiring increased levels for the required performance. Under some conditions, the presence of high levels of acid monomer will contribute to increased water sensitivity of the final film which makes them impractical as sole vehicles for use in most applications.

Other classes of rheological control additives other than alkali swellable acrylics are available which are used in combination with ASA types depending on the application and rheological profile required.

Conventional waterborne coatings typically rely on the inclusion of some co-solvent as an aid to film formation and giving the particles sufficient deformability to bind the pigment particles and hence form useful films. The added co-solvent evaporates from the film both during and after film formation contributing to unwanted odour and environmental damage.

This invention provides a formulating approach which is capable of overcoming both of these limitations. A latex can be formulated which can be used as a sole binder in a paint film without the use of co-solvent or external rheological control additives of any sort. For this objective it is preferable to carry out a sequential polymerisation where the reactive amphiphile and ionizable monomer are concentrated in a first feed, or "core" feed. The second feed of monomer is termed the "sheath" feed.

A dispersion designed to be the sole combined thickener/binder in a paint film will preferably be one where the volume occupied by the swollen polymer particles is sufficient to give the right viscosity to the fully formulated wet paint. This will also depend on the volume occupied by prime pigment, extender and other necessary ingredients. The extent to which the dispersion particles swell is controlled by the level of reactive amphiphile and ionisable monomer used and the way in which they are incorporated, whether in a sequential core/sheath manner or other means. Uncontrolled addition of the amphiphile and ionisable monomer will introduce high levels of relatively water sensitive ingredients which may compromise the resistance properties of the resulting paint film.

The combination of reactive amphiphile/ionizable monomer is generally in the core feed. Concentration of the reactive amphiphile to an initial core feed composition is particularly favourable allowing maximum swelling behaviour with minimum levels of amphiphile and total acid content. The combination of amphiphile and ionizable monomer is important to achieving the maximum swelling effect for given core/sheath ratio. Where the latex application is to achieve maximum particle swelling and the resulting composition is to be used as an additive thickener latex, the level of acid monomer may be higher. In these cases, it may also be preferable to construct the latex using a single non-sequential feed of uniform composition.

When preparing a binder with high swelling capacity, the core feed composition may represent a substantial portion of the total polymer. Such high swelling binders may be particularly useful in the formulation of a sealer/binder paint with low volatile organic content (VOC). The level of reactive amphiphile and ionizable monomer may be chosen so as to achieve the required swelling ratio in the final latex and paint. An alternative formulation approach would be to concentrate the reactive amphiphile/ionizable monomer combination in the core composition, so that high swelling will be achieved at lower core levels. Such a composition may be formed by using higher levels of ionizable monomer with a given level of reactive amphiphile.

The ability of a polymer dispersion to form a film is related to the glass transition temperature (Tg) of the polymer. In practice, this property is determined by measuring the minimum film forming temperature (MFFT) at which the film will form. In conventional latex formulations, the Tg of the polymer will be designed to have a direct relationship to the conditions of use by balancing monomers which produce high Tg homopolymers such as methyl methacrylate against monomer such as ethyl acrylate which produce low Tg homopolymers. Thus in general, latices will be formulated to have a Tg not exceeding 30° C. For coatings applications, latices may be formulated where the Tg may be as low as 0° C. or lower.

For the dispersions which are the subject of the present invention, the presence of the reactive amphiphile will generally act to reduce the MFFT of the dispersion. Plasticisation of the core by water will occur once it is hydrated. Hence the Tg of the core material is not a controlling factor in film formation and dispersions with Tg considerably above that of conventional film forming latices are possible. Where the Tg of the dispersion is very hard, typically above 45° C., the process of neutralisation is best carried out at elevated temperature.

According to the present invention it is possible to prepare latices which are not film forming at ambient temperature (MFFT above about 23° C.), until the latex is neutralised and the particle swells becoming plasticised by water. In this condition the MFFT can drop considerably without the addition of other coalescing aids. Under some conditions latices which show controlled shear thickening are possible.

Particle neutralisation can be carried out at any temperature. If conducted at ambient temperature limitation of the overall Tg of the particle, particularly the shell, is favoured. However, swelling of Tg particles is possible and may involve the addition of the neutralising base at elevated temperatures. This may limit the polymer concentration or solids content of the dispersion which can be prepared such that the dispersion will remain pourable or pumpable during use.

The polymerisation is conducted in aqueous solution and may be performed using micro, mini or conventional emulsion polymerisation, suspension or dispersion polymerisation. Preferably the polymerisation is an emulsion polymerisation. Preferably the polymerisation is a free radical polymerisation.

To obtain particles having the required properties the polymerisation must be performed in the presence of a stabilising agent. The type of stabilising agent will depend on the monomer composition used, type of polymerisation, temperature of the polymerisation, nature of the reactive amphiphile etc. Preferred stabilising agents include anionic surfactants, such as sodium dodecyl sulfate, nonyl phenol ethoxylate sulfate, alkyl ethoxylate sulfates, alkyl sulfonates, alkyl succinates, alkyl phosphates, alkyl carboxylates, and other alternatives well known to those skilled in the art. Other stabilising agents include polymeric stabilisers, cationic surfactants or non-ionic surfactants with cloud points above the polymerisation temperature.

The particle size of the polymer emulsion is related to the level of stabilizing agent used during the polymerisation. In order to obtain the optimum swelling of the particles, the stabilizer must be present in the correct amount to allow encapsulation of the reactive amphiphile and other hydrophilic material by the polymer, and not to result, for instance in nucleation of new particles late in the polymerisation process.

The particle size of the polymer dispersion can be varied by a number of methods well known to persons skilled in the art. Particle size can be related to total level of stabilising agent used and the way in which it is added during the polymerisation. The total level of stabilising agent is adjusted so as to maintain the stability of the particles formed early in the polymerisation. Such an objective can be achieved by the addition of a small amount of monomer and initiator in the presence of stabilising agent to form an initial population of polymer particles usually termed "seed particles". The seed particles are a means of controlling particle number and can be prepared by polymerising a small quantity of one or more of the monomers from the first seed or other appropriate monomers. Further growth of the seed is then induced by the gradual addition of further monomer and initiator together with a small quantity of additional stabilising agent. Large variations in initiator concentration at different stages can also be a method for size control.

For the dispersions which are the subject of the present invention, the size of the heteropolymer particles can be controlled by varying the addition rate of the reactive amphiphile. Rapid addition gives rise to large particles. More gradual addition of the reactive amphiphile leads to final particles which are smaller. Dispersions of small polymer particles are particularly useful in surface coatings applications where the uniformity of the film structure and surface appearance are important. Optimisation of the feed protocol for the addition of reactive amphiphile is an important requirement for the achievement of specific particle size targets.

Reduced particle size improves the ability of the dispersion to bind pigments and hence broadens the formulating latitude and gives films with more uniform structure and surface appearance. Accordingly the use of seed particle formation and feed protocols which result in a slow addition of reactive amphiphile are preferred when preparing a self thickening binder for paint applications.

The polymerisation process requires an initiating mechanism. The type and nature of the initiator or initiator system will depend on the types of monomers and the nature of the polymerisation.

For example, the polymerisation can be initiated by water soluble initiators such as ammonium persulfate, potassium persulfate, tertiary butyl hydroperoxide and sodium sulfite formaldehyde, or oil soluble initiators such as tertiary butyl perbenzoate or azo initiating compounds, such as AIBN. These can be used as thermal initiators or in suitable redox pairs well known to those skilled in the preparation of aqueous dispersions.

The polymerisation should be conducted at a temperature above the cloud point of the reactive amphiphile. Preferably the polymerisation temperature is greater than 5° C. above the cloud point, more preferably more than 10° C. The reaction is preferably conducted at a temperature below 120° C., more preferably below 100° C.

As mentioned above the thickening which occurs as a result of cooling the heteropolymer dispersion from the reaction temperature to below the cloud point of the reactive amphiphile can be enhanced by ionization of at least a portion of the ionizable groups of any ionizable monomer units. This can be achieved by adding a suitable neutralizing agent following polymerisation, or it can be achieved by adding the dispersion to an aqueous composition which is already alkaline or acidic or to which a base or acid is subsequently added for anionic or cationic latices respectively. Examples of bases which may be used to neutralise the acid groups include alkali metal bases, such as NaOH, KOH, $Na_2CO_3$ and $NaHCO_3$, ammonium hydroxide, alkaline earth metal bases such as $Ca(OH)_2$, or lower aliphatic amines, such as trimethylamine and triethylamine. Examples of acids which may be used to neutralise the basic groups include mineral acids, such as HCl, $H_2SO_4$, HNO3 and $H_3PO_4$ and organic acids, such as acetic acid, lactic acid, formic acid, citric acid and oxalic acid.

The dispersions of the present invention exhibit a temperature dependent viscosity, even after neutralisation. After polymerisation the dispersion is cooled to below the cloud point of the reactive amphiphile resulting in a swelling of the particles. Raising the temperature again can result in a reduction in viscosity (i.e. thinning), although this need not give the same viscosity as the original viscosity at that temperature. On reheating a dispersion which has been neutralised, the non-ionic component becomes dehydrated and the particles tend to shrink in volume. The viscosity in this case will generally not return to its original pre-neutralised value because of the presence of the neutralised ionizable groups.

As used herein the term "core" refers to the internal region of the polymeric particles and the term "sheath" refers to the outer regions. Throughout the specification the polymeric particles can often be referred by references to this core/sheath type structure. While the core/sheath terminology implies that the particles are composed of two separate structural components, of possibly different composition, it is to be understood that the particles may not have this exact structure and that the distinction between the core and the sheath may not be as precise as suggested by this terminology.

The aqueous dispersion of the present invention may be prepared via a single polymerisation step or the polymerisation may be conducted sequentially. Since it is the core which must contain the ionizable groups and the reactive amphiphile, when conducting the polymerisation sequentially it may not be necessary to include ionizable monomers or reactive amphiphiles in the outer layers or sheath. It has been found however that the presence of some ionizable monomers in the outer layers can assist penetration of the neutralising base and water into the core region. The presence of other hydrophilic monomers, such as those containing hydroxy, amide or ureido groups, may also assist in penetration of the neutralising agent. Conducting the polymerisation sequentially has several advantages, one of which is that the particles can be prepared in which the core and sheath have different compositions. When conducting the polymerisation sequentially it is important that the outer layers or sheath are permeable to the neutralising agent and water. It is also important that when the dispersion is to be used as a paint binder that the sheath has a composition which allows coalescence and film formation on curing of the paint. The coalescence and film formation may be aided by swelling of the particles with water, and the minimum film forming temperature (MFFT) may be considerably lower than the polymer glass transition temperature (Tg). The actual MFFT of particular latex will change with the extent of neutralisation of the internal acid or basic groups, the hydration of the amphiphile and the extent of water uptake and thickening. If necessary a conventional solvent such as Texanol™ (from Eastman) or Coasol™ (from Chemoxy Int.) may be added to assist coalescence and film formation.

The particles having the core and sheath structure described above are a particularly preferred embodiment of the present invention.

Accordingly in a further aspect the invention provides an aqueous dispersion of water insoluble heteropolymer particles wherein said heteropolymer particles comprise an inner polymeric core and an outer polymeric sheath, wherein said core incorporates units of a reactive amphiphile having a cloud point, said units of reactive amphiphile being substantially hydrated, and wherein at least a portion of said sheath comprises polymerised hydrophilic monomers, said dispersion exhibiting temperature dependent viscosity. In this aspect of the invention it is preferred that the polymeric core incorporates neutralized ionizable monomers.

The invention also provides an aqueous dispersion of water insoluble heteropolymer particles, wherein said heteropolymer particles incorporate units of hydrophilic ionizable monomers and reactive amphiphile throughout the particles.

The aqueous dispersions of the present invention may be used as a thickener or binder in a paint. In such application the dispersions are added to or combined with conventional paint additives or components to provide a paint base or composition of the required characteristics. Examples of suitable paint additives, in addition to the binder, include thickeners, antifungal agents, UV absorbers, extenders, pigments etc. Some of these additives may be precombined with the aqueous dispersions before incorporation into the paint composition. The aqueous dispersions may also be used as binders or thickeners for adhesives, textile coatings, carpet backings and construction materials. In these applications the dispersions may be combined with additives and components known in the art.

The aqueous dispersions of the present invention exhibit a temperature dependent viscosity which makes them useful in many applications in the coatings and adhesives industries.

Such dispersions are useful as self thickening sole binders for coatings. In this application the water swelling behaviour of the hydrophilic core material may be used to assist in film formation such that the conventional co-solvents normally used for this purpose are reduced or even eliminated. In addition to the environmental advantages, paints formulated in this way have a highly favourable cost/performance balance.

In a further embodiment of the invention, dispersions are formulated which show extremely high viscosity and even viscosity which increases with shear rate. Such dispersions can be blended with conventional paint making ingredients to give working paints with reduced levels of additive thickeners. The dispersions formulated in this way are able to display their viscosity characteristics at lower levels of acid monomer than those formulated with conventional alkali swellable thickener technology.

In order to facilitate an understanding of the invention reference will be made to the accompanying examples which illustrate some preferred aspects of the invention. However it is to be understood that the particularity of the following description is not to supersede the generality of the invention hereinbefore described.

EXAMPLES

In the examples the following abbreviations have the meanings indicated:

| Glossary of Monomer abbreviations | |
|---|---|
| MONOMER NAME | |
| acrylamide | AAM |
| acrylic acid | AA |
| butyl acrylate | BA |
| tert-butyl acrylate | TBA |
| tert-butylaminoethyl methacrylate | TBAEMA |
| N,N-dimethylaminoethyl methacrylate | DMAEMA |
| ethyl acrylate | EA |
| glyceryl propoxy triacrylate | GPTA |
| triethylene glycol diacrylate | TEGDA |
| Trimethylolpropane trimethacrylate | TMPTMA |
| glycidyl methacrylate | GMA |
| methacrylic acid | MAA |
| methyl methacrylate | MMA |
| styrene | ST |

In each of the following examples, the composition of the reactive amphiphile component is as designated by the manufacturer. Where the composition involves ethylene oxide units as part of the hydrophile, convention allows for composition to be described in terms of the average number of ethylene oxide (EO) units per chain. However for the purposes of this invention the cloud point of the material is an exact measure of the behaviour of the material and has been determined by experiment and specified in each example.

Viscosity measurements have been used to characterise the dispersions made in the examples. The equipment used for viscosity measurements are:

Brookfield Model DV-II+ Viscometer

Cone and Plate Cap1000 Viscometer

Rotothinner Viscometer

MFFT bar SS3000. Sheen Instruments

All viscosity measurements have been carried out in the range 20–30° C.

Example 1

(a) An aqueous dispersion of copolymeric particles was made by the following method:

(i) First monomer feed

A first monomer emulsion was made by adding to a vessel, 86.8 g of ethyl acrylate, 119.1 g of methyl methacrylate, 2.1 g of glyceryl propoxy triacrylate (Sartomer SR9020) and 5.7 g of acrylic acid. To this mixture 91 g of an ethoxylate (12EO) of HD-Ocenol 110/130 (Henkel) with a cloud point of 74–78° C. was added. To the monomer mixture was added 6.1 g of a 30% solution of sodium dodecyl sulfate in water, and 522.7 g of de-ionised water, and an emulsion formed under shear.

(ii) Second monomer feed

A second monomer emulsion was made by mixing 35.3 g of ethyl acrylate, 111.9 g of methyl methacrylate, 2.8 g of acrylic acid and 1.5 g of glyceryl propoxy triacrylate. To the monomer mix was added 3.0 g of a 30% solution of sodium dodecyl sulfate in water, and 267.6 g of deionised water. An emulsion was formed under shear.

(iii) Initiator feed

A solution of initiator was made by mixing 96.38 g of water, 1.93 g of ammonium persulfate, and 0.34 g of sodium carbonate.

(iv) Precursor stage 342.2 g of deionised water and 3.6 g of 30% sodium dodecyl sulfate in water were added to a round bottomed flask at 90° C., with stirring.

(v) Initiator spike

A mixture of 0.13 g of ammonium persulfate, 0.95 g of de-ionised water and 0.18 g of sodium carbonate was added to the reaction flask.

(vi) Polymerisation

Ten minutes after the addition of the initiator spike, the first monomer feed and initiator feed were pumped into the reaction flask under stirring. The first monomer feed was added to the reaction vessel over a period of 160 minutes, followed by the second monomer feed over 80 minutes. The initiator feed was added over the full 240 minute period.

(vii) Dilution and Mop-up

After completion of the 240 minute period, 89.3 g of water was added, followed by five consecutive initiator additions at 10 minute intervals, alternating between sodium sulfite formaldehyde (0.3 g) in water (8.1 g) and tertiary butyl hydroperoxide (0.5 g) mixed with water (8.1 g).

(viii) Post-addition

After a further 10 minutes, 7.2 g of a 25% ammonium hydroxide solution was added with 11.6 g of water. Subsequently, after 30 minutes, the latex was cooled to room temperature, and 0.1 g of the defoamer Bevaloid 4226 (Rhodia) 0.9 g of Proxel GXL (Avecia) and 161.6 g of water added.

(b) (Comparative) The procedure was repeated, except an ethoxylate (40EO) of HD-Ocenol 110/130 (Henkel) having a cloud point greater than 100° C. was used in place of the 12EO ethoxylate as the reactive amphiphile. The resulting latex was water thin (<20 rpm Brookfield viscosity, spindle 2, 20 rpm).

(c) (Comparative) The procedure was repeated, except an ethoxylate (20EO) of HD-Ocenol 110/130 having a cloud point greater than 100° C. was used in place of the 12EO ethoxylate as the reactive amphiphile.

The solids content and viscosities of the dispersions of Examples 1 and 3 were measured. The results are shown in Table 1 below.

TABLE 1

| Dispersion | Ocenol Ethoxylation | Solids (% nv) | Brookfield viscosity (cP)[1] | Cone & Plate viscosity (P) |
|---|---|---|---|---|
| 1a | 12EO | 22.36 | 58,000 | 1.9 |
| 1c | 20EO | 22.55 | 132 | 0.28 |

[1]Brookfield viscosity at 20 rpm

Example 2

The procedure of example 1 was repeated except 7-Octen-1-ol:1 butylene oxide:10 ethylene oxide having a cloud point of 75° C. was used as the reactive amphiphile and the amount of water at each stage was reduced. The compositions of the various stages are shown in Table 2 below.

TABLE 2

| | g |
|---|---|
| Precursor stage | |
| de-ionised water | 306.03 |
| 30% sodium dodecyl sulfate | 4.61 |
| Initiator feed | |
| Sodium carbonate | 0.23 |
| de-ionised water | 0.85 |
| ammonium persulfate | 0.17 |
| Initiator spike | |
| de-ionised water | 86.20 |
| ammonium persulfate | 2.50 |
| sodium carbonate | 0.44 |
| First monomer feed | |
| de-ionised water | 467.48 |
| 30% sodium dodecyl sulfate | 7.83 |
| EA | 112.96 |
| MMA | 154.89 |
| GPTA (glyceryl propoxytriacrylate) | 2.76 |
| AA | 7.89 |
| 7-octen-1-ol:1BO:10EO | 118.34 |
| Second monomer feed | |
| de-ionised water | 241.62 |
| 30% sodium dodecyl sulfate | 3.91 |
| EA | 45.86 |
| MMA | 145.45 |
| GPTA | 1.97 |
| AA | 3.94 |
| de-ionised water | 72.64 |
| Mop-up | |
| de-ionised water | 14.53 |
| sodium sulfite formaldehyde | 0.34 |
| de-ionised water | 7.26 |
| tert-butyl hydroperoxide | 0.70 |
| de-ionised water | 7.26 |
| sodium sulfite formaldehyde | 0.34 |
| de-ionised water | 7.26 |
| tert-butyl hydroperoxide | 0.70 |
| de-ionised water | 7.26 |
| sodium sulfite formaldehyde | 0.34 |
| Post-addition | |
| de-ionised water | 10.36 |
| ammomium hydroxide | 9.29 |
| Bevaloid 4226 | 0.14 |
| de-ionised water | 7.26 |
| Proxel GXL | 1.12 |
| de-ionised water | 137.25 |

The solid content and viscosity of the dispersion was measured before and after dilution of the latex and the results are shown in Table 3 below.

TABLE 3

| % surfactant | Solids (% nv) | Brookfield viscosity (cP)[1] | Rotothinner (P) | Cone and Plate viscosity (P) |
|---|---|---|---|---|
| 22 | 26.11[2] | solid | solid | <0.05 |
| 22 | diluted to 21.46 | 10,520 | >15 | 2.15 |

[1]Brookfield viscosity at 20 rpm
[2]Formula solids 30%. Latex diluted to avoid solidification.

Example 3 a) The procedure of Example 2 was repeated, except 7-octen-1-ol:7EO having a cloud point of 79° C. was used as the reactive amphiphile.

b) The procedure was repeated except 37% 7-octen-1-ol:14EO having a cloud point of 97–100° C. was used as an approximate molar replacement of the 22% 7-octen-1-ol:7EO.

The solids content and viscosities of the dispersions were measured. The results are shown below in Table 4.

TABLE 4

| Dispersion | Non-ionic Surfactant | Solids (% nv) | Brookfield viscosity (cP)[1] | Cone and Plate viscosity (P) |
|---|---|---|---|---|
| 3a | 7-octen-1-ol:7EO | 25.79 | Solid | Solid |
| 3b | 7-octen-1-ol:14EO | 24.38 | 40,550 | 0.625 |

Notes:
[1]Measured at 20 rm on spindle no. 2.

Although a large amount of 7-octen-1-ol:14EO was incorporated into the particles at the reaction temperature (below cloud point), cooling of the latex prompted little or no further uptake of water to swell the particles and cause further thickening.

Example 4 a) The procedure of Example 1 was repeated, except the monomer composition was altered to include butyl acrylate instead of ethyl acrylate. The resulting monomer composition in the first monomer feed contained 146.9 g of methyl methacrylate, 59.2 g of butyl acrylate, 2.1 g of glyceryl propoxy triacrylate and 5.7 g of acrylic acid. The second monomer feed contained 123.1 g of methyl methacrylate, 24.1 g of butyl acrylate, 1.52 g of glyceryl propoxy triacrylate and 2.83 g of acrylic acid.

b) The procedure was repeated, except the composition of the various stages was as shown in Table 5 below:

TABLE 5

| Precursor stage | g |
|---|---|
| de-ionised water | 314.61 |
| 30% sodium dodecyl sulfate | 5.46 |
| Initiator feed | |
| Sodium carbonate | 0.27 |
| de-ionised water | 1.46 |
| ammonium persulfate | 0.20 |
| Initiator spike | |
| de-ionised water | 114.25 |
| ammonium persulfate | 2.95 |
| sodium carbonate | 0.52 |
| First monomer feed | |
| de-ionised water | 385.24 |
| 30% sodium dodecyl sulfate | 9.27 |
| AA | 8.92 |
| MMA | 212.27 |
| GPTA (glyceryl propoxytriacrylate) | 3.11 |
| BA | 86.09 |
| Ocenol:12EO | 153.00 |
| Second monomer feed | |
| de-ionised water | 159.51 |
| 30% sodium dodecyl sulfate | 4.64 |
| AA | 4.33 |
| MMA | 188.23 |
| GPTA | 2.32 |
| BA | 36.86 |
| de-ionised water | 82.79 |
| Mop-up | |
| de-ionised water | 16.56 |
| sodium sulfite formaldehyde | 0.40 |
| de-ionised water | 8.28 |
| tert-butyl hydroperoxide | 0.83 |
| de-ionised water | 8.28 |
| sodium sulfite formaldehyde | 0.40 |
| de-ionised water | 8.28 |
| tert-butyl hydroperoxide | 0.83 |
| de-ionised water | 8.28 |
| sodium sulfite formaldehyde | 0.40 |
| Post-addition | |
| de-ionised water | 11.81 |
| ammonium hydroxide | 10.96 |
| Bevaloid 4226 | 0.17 |
| De-ionised water | 8.28 |
| Proxel GXL | 1.32 |
| de-ionised water | 156.43 |

The solids content and viscosity of the dispersions were measured. The results are shown in Table 6 below.

TABLE 6

| Dispersion | Solids (% nv) | BA content[1] | Brookfield viscosity (cP)[2] | Cone and Plate viscosity (P) |
|---|---|---|---|---|
| 4a | 22.15 | 18.26 | 8 | 0.03 |
| 4b | 29.46 | 17.69 | >100 000 | 4.2 |

[1]BA as a percentage of total latex solids.
[2]Brookfield viscosity at 20 rpm.

With MMA/BA rather than MMA/EA, higher solids may be required to achieve the desired thickening.

Example 5 a) The procedure of Example 1 was repeated except trimethylolpropane trimethacrylate was used as the crosslinking agent, rather than GPTA. The substitution was on a weight basis.

b) The procedure of Example 1 was repeated, except triethylene glycol diacrylate (TEGDA) was used as the crosslinking agent, rather than GPTA.

The viscosity of the dispersions was measured and compared to the viscosity of the dispersion obtained in Example 1a. The results are shown below in Table 7.

TABLE 7

| Dispersion | Crosslinker | Solids (% nv) | Brookfield viscosity (cP)[1] | Cone and Plate viscosity (P) |
|---|---|---|---|---|
| 1a | GPTA | 22.36 | 53,000[1] | 1.91 |
| 5a | TEGDA | 22.42 | 9,150[1] | 1.76 |
| 5b | TMPTMA | 22.60 | Solid | Solid |

[1]Measured at 2 rpm.

Example 6 a) An aqueous dispersion of copolymeric particles was made by the following method:

(i) First monomer feed
A first monomer emulsion was made by adding to a vessel, 43.16 g of ethyl acrylate, 59.19 g of methyl methacrylate, 1.06 g of glyceryl propoxy triacrylate (Sartomer SR9020) and 3.01 g of acrylic acid. To this mixture 45.22 of an ethoxylate phosphate of HD-Ocenol 110/130 (Henkel). The surfactant was ethoxylated to approximately 10 moles. To the monomer mixture was added 3.0 g of a 30% solution of sodium dodecyl sulfate in water, and 258.9 g of de-ionised water, and an emulsion formed under shear.

(ii) Second monomer feed
A second monomer emulsion was made by mixing 17.53 g of ethyl acrylate, 55.58 g of methyl methacrylate, 0.75 g of acrylic acid and 0.75 g of glyceryl propoxy triacrylate. To the monomer mix was added 1.5 g of a 30% solution of sodium dodecyl sulfate in water, and 133.8 g of deionised water. An emulsion was formed under the shear.

(iii) Initiator feed
A solution of initiator was made by mixing 47.74 g of water, 0.95 g of ammonium persulfate, and 0.17 g of sodium carbonate (iv) Precursor stage
342.2 g of deionised water and 3.6 g of 30% sodium dodecyl sulfate in water were mixed in a round bottomed flask at 90° C., with stirring.

(v) Initiator spike
A mixture of 0.06 of ammonium persulfate, 0.47 g of deionised water and 0.09 g of sodium carbonate were added to the reaction flask.

(vi) Polymerisation
Ten minutes after the addition of the initiator spike, the first monomer feed and initiation feed were pumped into the reaction flask under stirring. The first monomer feed was added to the reaction vessel over a period of 160 minutes, followed by the second monomer feed over 80 minutes. The initiator was added over the full 240 minute period.

(vii) Dilution and Mop-up
After completion of the 240 minute period, 40.23 g of water was added, followed by five consecutive initiator additions at 10 minute intervals, alternating between sodium sulfite formaldehyde (0.13 g) in water (4.0 g) and tertiary butyl hydroperoxide (0.13 g) mixed with water (4.0 g).

(viii) Post-addition
After a further 10 minutes, 3.55 g of a 25% ammonium hydroxide solution was added with 5.74 g of water. Subsequently, after 30 minutes, the latex was cooled to room temperature, and 0.05 g of Bevaloid 4226 (Rhodia), 0.4 g of Proxel GXL (Avecia) and 76.1 g of water added.

b) (Comparative) The procedure was repeated except Ocenol:3EO sulfate (no cloud point at pH of polymerisation) was used instead of Ocenol:10EO phosphate.

c) (Comparative) The procedure was repeated except on a 2 kg scale and the Ocenol:ethoxylate phosphate was included in the precursor stage (with the initial charge of water and sodium dodecyl sulfate in the reactor) rather than in the first monomer feed. In addition, 4.02 g of sodium carbonate was added to the precursor stage.

d) (Comparative) The procedure was repeated, except ammonia was used to bias the pH to 9 rather then adding sodium carbonate.

The viscosities of the dispersions were then measured and the results are as shown in Table 8 below.

a 30% solution of sodium dodecyl sulfate in water, and 196.6 g of deionised water. An emulsion was formed under shear.

(iii) Initiator feed
A solution of initiator was made by mixing 105.2 g of water, 2.1 g of ammonium persulfate, and 0.37 g of sodium carbonate.

(iv) Precursor stage
373.5 g of deionised water and 7.5 g of 30% sodium dodecyl sulfate in water were mixed in a round bottomed flask at 80° C., with stirring.

(v) Initiator spike
A mixture of 0.14 g of ammonium persulfate, 1.0 g of deionised water and 0.2 g of sodium carbonate were added to the reaction flask.

(vi) Polymerisation
Ten minutes after the addition of the initiator spike, the first monomer feed and initiator feed were pumped into the reaction flask under stirring. The first monomer feed was added to the reaction vessel over a period of 160 minutes, followed by the second monomer feed over 80 minutes. The initiator feed was added over the full 240 minute period.

(vii) Dilution and Mop-up
After completion of the 240 minute period, 59.1 g of water was added, followed by three consecutive initiator additions at 10 minute intervals; sodium

TABLE 8

| Example | pH[1] | Surfactant | pH biasing agent | Solids (% nv) | Dw (nm) | Brookfield Viscosity[2] (cP) | Cone and Plate viscosity (P) |
|---|---|---|---|---|---|---|---|
| 6a | 3 | Ocenol:10EO phosphate | None | 23.15 | 1690 | 1200 | 0.4 |
| 6a[3] | 3 | Ocenol:10EO phosphate | None | not measured | not measured | not measured | 1.2 |
| 6b | 7 | Ocenol:3EO sulphate | None | 22.04 | not measured | <20 | 0.5 |
| 6c | 7 | Ocenol:10EO phosphate | $Na_2CO_3$ | 22.90 | 79 | 40 | 0.14 |
| 6d | 9 | Ocenol:10EO phosphate | Ammonia | 22.61 | 30 | 50 | 0.04 |

[1]of process
[2]Brookfield viscosity at 20 rpm.
[3]To a small sample of the latex sufficient additional aqueous ammonia was added to raise the pH to 10 prior to viscosity measurement.

Example 7 a) An aqueous dispersion of copolymeric particles was made by the following method:

(i) First Monomer Feed
A first monomer emulsion was made by adding to a vessel, 94.8 g of ethyl acrylate, 130.0 g of methyl methacrylate, 2.32 g of glyceryl propoxy triacrylate (Sartomer SR9029) and 6.2 g of acrylic acid. To this mixture 99.3 g of an ethoxylate of HD-Ocenol 110/130 (Henkel) with a cloud point of 74–78% C was added. To the monomer mixture was added 10.0 g of a 30% solution of sodium dodecyl sulfate in water, and 570.5 g of de-ionised water, and an emulsion formed under shear.

(ii) Second monomer feed
A second monomer emulsion was made by mixing 38.6 g of ethyl acrylate, 122.0g of methyl methacrylate, 3.1 g of acrylic acid and 1.7 g of glyceryl propoxy triacrylate. To the monomer mix was added 5.0 g of sulfite formaldehyde (0.14 g) in water (11.82 g), tertiary butyl hydroperoxide (0.30 g) mixed with water 911.82 g) and sodium sulfite formaldehyde (0.14 g) in water (11.82 g).

(viii) Post-addition
After a further 30 minutes, 7.8 g of a 25% ammonium hydroxide solution was added with 8.4 g of water. Subsequently, after 30 minutes, the latex was cooled to room temperature, and 0.1 g of Bevaloid 4226 (Rhodia), 0.95 g of Proxel GXL (Avecia) and 117.6 g of water added.

b) The procedure was repeated, except the polymerisation was conducted at 85° C.

c) The procedure was repeated, except the temperature of the polymerisation was 90° C.

The viscosities of the dispersions were measured. The results are shown in Table 9 below.

TABLE 9

| Example | Solids (% nv) | Polymerisation Temperature (° C.) | Viscosity Bf[1] (cP) | Rotothinner viscosity (P) | Cone and Plate viscosity (P) |
|---|---|---|---|---|---|
| 7a[2] | 21.9 | 90 | 47 000 | — | 0.83 |
| 7b[3] | 18.39 | 85 | 5 500 | >20 | 0.91 |
| 7c[2] | 22.38 | 80 | 5 | 0.1 | 0.1 |

[1]Brookfield viscosity at 2 rpm.
[2]Theoretical solids 25% nv.
[3]Theoretical solids 22.93% nv. Extra water was added to prevent solidification during cooling.

This comparison between different polymerisation temperatures demonstrates that the thickening process is temperature dependent. In order to obtain optimum thickening, the polymerisation temperature should be above the cloud point, in this case, 74–78° C.

Example 8 a) Aqueous dispersion (i) First monomer feed/monomer spike

A first monomer emulsion was made by adding to a vessel, 59.46 g of ethyl acrylate, 58.50 g of methyl methacrylate, 3.54 g of acrylic acid. 6.07 g of this monomer mixture is put to one side to form the monomer spike. To the remaining mixture, 52.07 g of an ethoxylate of HD-Ocenol 110/130 (Henkel) with a cloud point of 74–78° C. was added. To the remaining monomer mixture was added 3.44 g of a 30% solution of sodium dodecyl sulphate in water, and 262.49 g of deionised water and an emulsion formed under shear.

(ii) Second monomer feed

A second monomer emulsion was made by mixing 199.00 g of ethyl acrylate, 115.97 g of methyl methacrylate, 6.57 g of acrylic acid and 0.81 g of glyceryl propoxy triacrylate. To the monomer mix was added 6.40 g of a 30% solution of sodium dodecyl sulphate in water and 503.91 g of deionised water. An emulsion was formed under shear.

(iii) Initiator feed

A solution of initiator was made by mixing 92.19 g of deionised water, 2.09 g of ammonium persulphate, and 0.37 g of sodium carbonate.

(iv) Precursor stage 319.41 g of deionised water and 3.87 g of 30% sodium dodecyl sulphate in water were mixed in a round bottomed flask at 90° C. with stirring.

(v) Initiator spike

A mixture of 0.14 g of ammonium persulphate, 8.77 g of deionised water and 0.19 g of sodium carbonate were added to the reaction flask.

(vi) Polymerisation

The initiator spike was added to the precursor stage at 90° C. and held for 5 minutes, followed by the monomer spike and a further hold at temperature for 5 minutes. The first monomer feed was pumped to the reaction flask under stirring over a period of 160 minutes, followed by the second monomer feed over 80 minutes. The initiator feed was added over the full 240 minute period whilst maintaining the temperature between 89–90° C.

(vii) Dilution and Mop-up

After completion of the 240 minute period, 77.69 g of deionised water was added, followed by consecutive initiator additions at 10 minute intervals; sodium formaldehyde sulphoxylate (0.28 g) in deionised water (15.54 g), tertiary butyl hydroperoxide (0.59 g) mixed with deionised water (7.77 g), sodium formaldehyde sulphoxylate (0.28 g) in deionised water (7.77 g), tertiary butyl hydroperoxide (0.59 g) mixed with deionised water (7.77 g), and finally sodium formaldehyde sulphoxylate (0.28 g) in deionised water(7.77 g).

(viii) Post-addition

After a further 30 minutes, 7.79 g of a 25% ammonium hydroxide solution was added with 11.08 g of deionised water. Subsequently, after 30 minutes, the latex was cooled to room temperature, and 0.12 g of Bevaloid 4226(Rhodia), 0.94 g of Proxel GXL (Zenecca) and 154.56 g of deionised water was added.

After cooling and testing the latex had the characteristics shown below in Table 10.

TABLE 10

| Brookfield Viscosity (cP) spindle 2, 20 rpm | Rotothinner (P) | Cone & Plate (P) |
|---|---|---|
| 3,550 | 7.9 | 1.14 | b) Paint formulation

Sealer/undercoat paints were prepared according to the formulation shown below in Table 11. Components are expressed in parts by weight.

TABLE 11

| | Material | Standard Paint | Test Paint |
|---|---|---|---|
| A | De-ionised water | 101.20 | 101.20 |
| | Dispersant (Calgon T, Albright & Wilson) | 1.00 | 1.00 |
| B | Dispersant (Oraton 731, Rohm & Haas USA) | 4.80 | 4.80 |
| | Surfactant (Triton CF10 Union Carbide USA) | 3.00 | 3.00 |
| | Anti-foam (Bevaloid 6681 Rhodia) | 0.10 | 0.10 |
| C | Titanium dioxide (Tronox CR828, Kerr Magee) | 190.00 | 190.00 |
| | Silica (Diafil 530, CR Minerals USA) | 30.00 | 30.00 |
| | Clay (Eckalite 1, ECC/Kaolin) | 25.00 | 25.00 |
| D | Latex | 310.00* | 576.60** |
| | De-ionised water | 283.90 | 17.30 |
| | Proxel GXL (Avecia) | 1.60 | 1.60 |
| | Thickener (Acrysol RM2020 NPR, Rohm & Haas) | 6.50 | 0.00 |
| E | Antifoam (Bevaloid 5581, Rhodia) | 1.00 | 1.00 |
| F | Thickener (Acrysol RM2020 NPR) | 41.00 | 0.00 |

*Commercial anionic acrylic latex 46.5% non-volatiles, Rohm & Haas Primal PR3230
**Latex is produced in Example 8a 25% non-volatiles The paint was produced by dispersing the C stage pigments into the combined A plus B stages. The finished millbase is added to the pre-mixed D stage in a separate vessel and adjusted with E and F stages.

The properties of the paints are shown below in Table 12.

TABLE 12

| Viscosity | Standard Paint | Test Paint |
|---|---|---|
| Brookfield (cP) | 11,380 | 11,060 |
| Cone & Plate (P) | 1.22 | 0.71 |
| Rotothinner (P) | 6.7 | 4.5 |

When tested as a sealer/undercoat paint the test paint (having no coalescing aids or external thickeners) had equivalent or better performance compared to the standard paint. The characterisation of the paint is shown below in Table 13.

TABLE 13

| Property | Standard Paint | Test Paint |
|---|---|---|
| Opacity | Good | Good + |
| Adhesion | Poor | Good |
| Time taken to develop early water resistance | 5 hours + | 2 hours |
| Flow | Good | Very good |
| Mudcracking | Excellent | Excellent |

Example 9

(a) Aqueous dispersion (i) Aqueous dispersion

A monomer emulsion was prepared directly in a reaction vessel by adding the following components in order, 70.00 g of methyl methacrylate, 70.00 g of butyl acrylate, 0.20 g of glyceryl propoxy triacrylate, 60.0 g of an ethoxylate (9EO) of HD-Ocenol 110/130 (Henkel) with a cloud point of 57° C., 4.00 g of Rhodapex CO436 (Rhodia) and 276.09 g of deionised water. The mixture heated to 80° C. under a nitrogen atmosphere.

(ii) Initiator feed

A solution of initiator was made by mixing 2.00 g of ammonium persulphate and 12.00 g of deionised water.

(iii) Initiator spike

Two separate solutions were made by mixing in the first, 0.26 g of tertiary butyl perbenzoate and 2.66 g of deionised water. The second spike solution was made by mixing 0.13 g of sodium erthyorbate with 2.66 g of deionised water.

(iv) Polymerisation

The initiator feed was added to the monomer emulsion stage at 80° C. at the rate of 1 ml/minute so as to control the level of reaction exotherm between 80–87° C. After 15 minutes add initiator spike stages and commence cooling.

(b) (Comparative) The procedure was repeated, except that and ethoxylate (15EO) of HD-Ocenol 110/130 having a cloud point of 99° C. was used in place of the 9EO as the reactive amphiphile.

(c) (Comparative) The procedure was repeated, except that the reactive amphiphile was omitted from the monomer emulsion stage completely. The monomer emulsion stage was made by mixing 100.00 g of methyl methacrylate, 100.00 g of butyl acrylate, 0.20 g of glyceryl propoxy triacrylate, 4.00 g of Rhodapex C0436 (Rhodia) and 276.09 g of deionised water.

The solids content were adjusted to match closely so that viscosities could be compared. The results are shown below in Table 14.

TABLE 14

| Dispersion | Ocenol | Cloud Point ° C. | Solids (% nv) | Brookfield viscosity (cP) |
|---|---|---|---|---|
| 1a | 9EO | 57 | 34.7 | 388 |
| 1b | 15EO | 99 | 36.5 | 64 |
| 1c | — | — | 35.0 | 10 |

Example 10

(a) An aqueous emulsion of copolymeric particles was made by the following method:

(i) A first monomer emulsion was made by adding to a vessel, 36.15 g of ethyl acrylate, 35.57 g of methyl methacrylate and 2.15 g of acrylic acid. A portion of this monomer mixture equivalent to 5% or 3.69 g was removed from the vessel and set aside to become the seed monomer addition.

To the remaining monomer mixture, 31.66 g of an ethoxylate (12EO) of HD-Ocenol 110/130 (Henkel) was added. To this mixture, 2.09 g of a 30% solution of sodium dodecyl sulfate in water and 255.86 g of de-ionised water was added and an emulsion formed under shear.

(ii) Second monomer feed

A second monomer emulsion was made by mixing 369.23 g of ethyl acrylate, 206.35 g of methyl methacrylate, 20.93 g of acrylic acid and 1.5 g of glyceryl propoxy triacrylate. To this mixture was added 11.86 g of a 30% solution of sodium dodecyl sulfate in water and 396.37 g of de-ionised water and an emulsion formed under shear.

(iii) Initiator feed

A solution of initiator was made by mixing 118.83 g of de-ionised water, 2.97 g of ammonium persulfate and 0.53 g of sodium carbonate.

(iv) Precursor stage 300.85 g of de-ionised water and 5.48 g of 30% sodium dodecyl sulfate in water were added to a round bottomed flask at 90° C. with stirring.

(v) Initiator spike

A mixture of 0.27 g of sodium carbonate. 11.31 g of de-ionised water and 0.20 g of ammonium persulfate was added to the reaction flask.

(vi) Polymerisation

Five minutes after the addition of the initiator spike, the seed monomer component withheld from t he first monomer feed was added (3.69 g) and the reaction held at temperature for a further 5 minutes to complete the formation of seed particles.

The remainder of the first monomer feed and the initiator feed were then pumped to the reaction flask under stirring. The first monomer feed was added to the reaction vessel over a period of 74 minutes together with an amount of initiator feed equivalent to 15% of the total.

The feed rate was then adjusted so as to deliver the remaining initiator feed and the second monomer feed over 202 minutes. All feeds were completed in a total of 276 minutes.

(vii) Dilution and Mop-up

After completion of the 276 minute period, 46.73 g of water was added, followed by five consecutive initiator additions at 10 minute intervals alternating between sodium sulfite formaldehyde (0.40 g) in de-ionised water (9.35 g) and tertiary butyl hydroperoxide (0.83 g) in de-ionised water (4.67 g).

(viii) Post-addition

After a further 10 minutes, the latex was cooled to room temperature and 0.17 g of the defoamer Bevaloid 4226 (Rhodia), 1.33 g of proxel GXL (Avecia) and a total of 92.97 g of de-ionised water was added.

(b) The procedure was repeated except that the polymerisation procedure for addition of seed monomer was omitted.

The (3.69 g) of seed monomer was incorporated into the first monomer feed and this first feed was added to the reaction flask over 74 minutes as for example 10.

(c) The procedure was repeated except that the feed rate of the first monomer feed and its accompanying portion of the initiator feed was completed over 32 minutes. The remaining initiator feed and the second monomer feed was completed over 234 minutes to achieve the same total feed time of 276 minutes.

The latices was characterised as shown below in Table 15.

TABLE 15

| Dispersion | Appearance | Weight Average Particle Diameter Dw (nm)[1] |
|---|---|---|
| 10a | translucent | 86.1 |
| 10b | translucent | 95.8 |
| 10c | white opaque | — |

[1]Measured using Capillary Hydrodynamic Fractionation (CHDF)

Dispersion produced as example 10a and 10b gave similar appearance typical of fine particle size materials. Example 10c made with a rapid addition of the reactive amphiphile is very different and its particle size could not be quantified by CHDF. The appearance was typical of material well in excess of 200 nm, while the CHDF is unable to detect particles in excess of 1 μm in diameter.

Example 11

(a) An aqueous dispersion of copolymeric particles was made by the following method:
(i) A first monomer emulsion was made by adding to a vessel, 169.03 g of ethyl acrylate, 169.51 g of methyl methacrylate and 9.87 g of acrylic acid. A portion of this monomer mixture equivalent of 5% or 17.42 g was removed from the vessel and set aside to become the seed monomer addition.
To the remaining monomer mixture, 148.05 g of an ethoxylate (12EO) of HD-Ocenol 110/130 (Henkel) was added. To this mixture, 9.79 g of a 30% solution of sodium dodecyl sulfate in water and 754.35 g of de-ionised water was added and an emulsion formed under shear.
(ii) Second monomer feed
A second monomer emulsion was made by mixing 34.56 g of ethyl acrylate, 207.25 g of methyl methacrylate, and 4.93 g of acrylic acid. To this mixture was added 4.90 g of a 30% solution of sodium dodecyl sulfate in water and 389.89 g of de-ionised water and an emulsion formed under shear.
(iii) Initiator feed
A solution of initiator was made by mixing 139.10 g of de-ionised water, 3.13 g of ammonium persulfate and 0.55 g of sodium carbonate.
(iv) Precursor stage
481.92 g of de-ionised water and 5.77 g of 30% sodium dodecyl sulfate in water were added to a round bottomed flask at 90° C. with stirring.
(v) Initiator spike
A mixture of 0.29 g of sodium carbonate. 13.23 g of de-ionised water and 0.21 g of ammonium persulfate was added to the reaction flask.
(vi) Polymerisation
Five minutes after the addition of the initiator spike, the seed monomer component withheld from the first monomer feed was added (17.42 g) and the reaction held at temperature for a further 5 minutes to complete the formation of seed particles.

The remainder of the first monomer feed and the initiator feed were then pumped to the reaction flask under stirring. The first monomer feed was added to the reaction vessel together over a period of 170 minutes followed by the second monomer feed over 81 minutes. The initiator feed was added over the full 251 minute period.
(vii) Dilution and Mop-up
After completion of the 251 minute period, 117.22 g of water was added, followed by five consecutive initiator additions at 10 minute intervals alternating between sodium sulfite formaldehyde (0.42 g) in de-ionised water (11.72 g) and tertiary butyl hydroperoxide (0.88 g) in de-ionised water (11.72 g).
(viii) Neutralisation
After polymerisation the dispersion was cooled to room temperature and divided into five samples of known weight. Four of the samples were treated with neutralisation and post additives consisting of 2.33 g of 25% ammonium hydroxide in 3.34 g of de-ionised water, 0.04 g of B4226 (Rhodia) in 2.34 g of de-ionised water and 0.28 g of Proxel GXL (Avecia) in 44.29 g of de-ionised water. The four treated samples were reheated to a range of temperatures and held for 15 minutes to complete neutralisation and then cooled to room temperature. The fifth sample was not neutralised.
The samples were compared for their viscosity and also their ability to form films as measured by Minimum Film Forming Temperature (MFFT). The results are shown below in Table 16.

TABLE 16

| | Neutralisation Temp. (° C.) | MFFT (° C.) | Brookfield Viscosity (cP) Spindle 4@20rpm |
|---|---|---|---|
| Sample A | 90 | 5 | 8320 |
| Sample B | 70 | 14.8 | 3620 |
| Sample C | 50 | 21.4 | 100 |
| Sample D | 25 | 19 | 40 |
| Sample E | Not neutralised | >23 | 40 |

In this example the shell of the dispersion is very hard and non film forming. As the temperature of neutralisation is increased above the shell Tg, the dispersion thickens and displays substantially lowered MFFT due to the plasticising effect of water inside the particles. The calculated Tg of the core is 30° C. and of the shell is 80° C.

Example 12

The procedure of Example 1 was repeated except Blemmer 70PEP-350B having a cloud point of 58.5 was used as the reactive amphiphile. The compositions of the various stages was as shown below in Table 17.

TABLE 17

| | g |
|---|---|
| First monomer feed | |
| de-ionised water | 251.45 |
| 30% sodium dodecyl sulfate | 3.26 |
| EA | 47.27 |
| MMA | 65.57 |
| AA | 3.29 |

TABLE 17-continued

|  | g |
| --- | --- |
| Blemmer 70-350B (NOF Corporation, Japan) | 49.35 |
| Second monomer feed | |
| de-ionised water | 129.96 |
| 30% sodium dodecyl sulfate | 1.63 |
| EA | 19.25 |
| MA | 61.36 |
| AA | 1.64 |
| Initiator feed | |
| de-ionised water | 46.37 |
| ammonium persulfate | 1.04 |
| sodium carbonate | 0.18 |
| Precursor stage | |
| de-ionised water | 160.64 |
| 30% sodium dodecyl sulfate | 1.92 |
| Initiator spike | |
| Sodium carbonate | 0.10 |
| de-ionised water | 4.41 |
| ammonium persulfate | 0.07 |
| Dilution and Mop-up | |
| de-ionised water | 39.07 |
| 1. de-ionised water | 7.81 |
| sodium sulfite formaldehyde | 0.14 |
| 2. de-ionised water | 3.91 |
| tert-butyl hydroperoxide | 0.29 |
| 3. de-ionised water | 3.91 |
| sodium sulfite formaldehyde | 0.14 |
| 4. de-ionised water | 3.91 |
| tert-butyl hydroperoxide | 0.29 |
| 5. de-ionised water | 3.91 |
| sodium sulfite formaldehyde | 0.14 |

The dispersion had a pH of 2.5 and a Cone and Plate viscosity of 0.05 P. After addition of an aliquot of ammonia to the dispersion at 90° C., the sample had a pH of 9.1 and a Cone and Plate viscosity of 1.29 P Example 13

(i) A first monomer emulsion was made by adding to a vessel, 47.05 g of ethyl acrylate, 45.83 g of methyl methacrylate and 3.26 g of methacrylic acid. A portion of this monomer mixture equivalent to 5% or 4.81 g was removed from the vessel and set aside to become the seed monomer addition.

To the remaining monomer mixture, 41.20 g of an ethoxylate (12EO) of HD-Ocenol 110/130 (Henkel) was added. To this mixture, 2.72 g of a 30% solution of sodium dodecyl sulfate in water and 301.77 g of de-ionised water was added and an emulsion formed under shear.

(ii) Second monomer feed
A second monomer emulsion was made by mixing 339.21 g of ethyl acrylate, 186.47 g of methyl methacrylate, 22.30 g of methacrylic acid and 1.37 g of glyceryl propoxy triacrylate. To this mixture was added 10.90 g of a 30% solution of sodium dodecyl sulfate in water and 370.95 g of de-ionised water and an emulsion formed under shear.

(iii) Initiator feed
A solution of initiator was made by mixing 118.16 g of de-ionised water, 2.90 g of ammonium persulfate and 0.51 g of sodium carbonate.

(iv) Precursor stage
300.85 g of de-ionised water and 5.35 g of 30% sodium dodecyl sulfate in water were added to a round bottomed flask at 90° C. with stirring.

(v) Initiator spike
A mixture of 0.27 g of sodium carbonate, 11.24 g of de-ionised water and 0.20 g of ammonium persulfate was added to the reaction flask.

(vi) Polymerisation
Five minutes after the addition of the initiator spike, the seed monomer component withheld from the first monomer feed was added (4.81 g) and the reaction held at temperature for a further 5 minutes to complete the formation of seed particles.

The remainder of the first monomer feed and the initiator feed were then pumped to the reaction flask under stirring. The first monomer feed was added to the reaction vessel over a period of 90 minutes together with an amount of initiator feed equivalent to 20% of the total.

The feed rate was then adjusted so as to deliver the remaining initiator feed and the second monomer feed over 200 minutes. All feeds were completed in a total of 290 minutes.

(vii) Dilution and Mop-up
After completion of the 290 minute period, 46.47 g of water was added, followed by five consecutive initiator additions at 10 minute intervals alternating between sodium sulfite formaldehyde (0.39 g) in de-ionised water (9.35 g), tertiary butyl hydroperoxide (0.83 g) in de-ionised water (4.67 g) and sodium sulfite formaldehyde (0.39 g) in de-ionised water (4.65 g).

(viii) Post-addition
After a further 10 minutes, the latex was cooled to room temperature and 0.16 g of the defoamer Bevaloid 4226 (Rhodia), 1.3 g of proxel GXL (Zeneca) and a total of 92.45 g of de-ionised water was added.

Samples of the dispersion were diluted to 25% solids with deionized water and 25% ammonium hydroxide added to raise the pH. The pH was measured immediately and the viscosity of each sample was measured after 6 days. The characteristics of the dispersion samples are shown in Table 18.

TABLE 18

| Initial pH | Brookfield viscosity after 6 days |
| --- | --- |
| 2.89 | 6 |
| 9.22 | 54 400 |

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

Those skilled in the art will appreciate that the invention described herein is susceptible to variations and modifications other than those specifically described. It is to be understood that the invention includes all such variations and modifications. The invention also includes all of the steps, features, compositions and compounds referred to or indicated in this specification, individually or collectively, and any and all combinations of any two or more of said steps or features.

What is claimed is:

1. A process for preparing an aqueous dispersion of water insoluble polymer particles comprising:
   a) preparing by polymerisation an aqueous dispersion of water insoluble particles of a heteropolymer including monomeric units of a reactive amphiphile having a cloud point and monomeric units of a hydrophilic monomer, said polymerisation being conducted in the presence of a stabilising agent and the reactive amphiphile and at a temperature of more than 5° C. above the cloud point of said amphiphile, b) cooling said aqueous dispersion to a temperature below the cloud point of the reactive amphiphile such that the viscosity of the aqueous dispersion increases.

2. A process according to claim 1 wherein the reactive amphiphile is incorporated into the backbone of said heteropolymer.

3. A process according to claim 2 wherein the reactive amphiphile includes one or more double or triple bonds.

4. A process according to claim 3 wherein the reactive amphiphile is selected from unsaturated fatty acid alkoxylates, unsaturated fatty alcohol alkoxylates and surfactants containing reactive double bonds derived from (meth)acryl or vinyl groups.

5. A process according to claim 2 wherein the amphiphile includes a group selected from carboxylate, sulfonate, phosphate and primary and secondary amine groups.

6. A process according to claim 1 wherein the heteropolymer includes in its backbone a monomer comprising a terminal or pendant functional group which reacts with a reactive group present on the reactive amphiphile such that the reactive amphiphile is incorporated into the heteropolymer.

7. A process according to claim 6 wherein the reactive amphiphile includes a reactive group selected from carboxylate, sulfonate, phosphate and primary and secondary amine groups.

8. A process according to claim 1 wherein the reactive amphiphile has a cloud point of greater than 10° C. above the use temperature of a water based composition or paint into which it is incorporated.

9. A process according to claim 8 wherein the reactive amphiphile has a cloud point of greater than 45° C.

10. A process according to claim 8 wherein the reactive amphiphile has a cloud point of between 50° C. and 100° C.

11. A process according to claim 1 wherein the amount of reactive amphiphile used to prepare the water insoluble particles of heteropolymer is from 1 to 35% by weight of the heteropolymer.

12. A process according to claim 1 wherein the hydrophilic monomer comprises 5 to 99% by weight of the heteropolymer.

13. A process according to claim 1 wherein at least a portion of the monomeric units of hydrophilic monomer have ionizable groups.

14. A process according to claim 13 wherein the ionizable groups are acid groups.

15. A process according to claim 14 wherein the hydrophilic monomer having ionizable acid groups is selected from methacrylic acid, acrylic acid, itaconic acid, p-styrene carboxylic acids, p-styrene sulfonic acids, vinyl sulfonic acid, vinyl phosphonic acid, ethacrylic acid, alpha-chloroacrylic acid, crotonic acid, fumaric acid, citraconic acid, mesaconic acid and maleic acid.

16. A process according to claim 13 wherein the hydrophilic monomers having ionizable groups make up 0.1 to 40% by weight of the heteropolymer.

17. A process according to claim 1 wherein the heteropolymer contains monomeric units of a hydrophobic monomer having a water solubility of less than 5 g/L.

18. A process according to claim 17 wherein the hydrophobic monomer is selected from styrene, alpha-methyl styrene, butyl acrylate, butyl methacrylate, amyl methacrylate, hexyl methacrylate, lauryl methacrylate, stearyl methacrylate, ethyl hexyl methacrylate, crotyl methacrylate, cinnamyl methacrylate, oleyl methacrylate, ricinoleyl methacrylate, vinyl butyrate, vinyl tert-butyrate, vinyl stearate and vinyl laurate.

19. A process according to claim 13 wherein the polymerisation is carried out using a sequential polymerisation process in which the reactive amphiphile and ionizable monomers are concentrated in a first feed which is polymerised prior to addition and polymerisation of a second feed in which the ionizable monomer and/or reactive amphiphile are absent or in lower concentrations relative to the first feed.

20. A process according to claim 19 wherein seed particles are prepared prior to polymerisation of said first feed.

21. A process according to claim 1 wherein the stabilising agent is selected from anionic surfactants, polymeric stabilisers, cationic surfactants and non-ionic surfactants which cloud points above the temperature of polymerisation.

22. A process according to claim 22 wherein the polymerisation temperature is below 120° C.

23. A process according to claim 13 wherein the viscosity of the aqueous dispersion is further increased after polymerisation by neutralisation of at least a portion of the ionizable groups.

24. An aqueous dispersion of water insoluble heteropolymer particles wherein said heteropolymer particles comprise an inner polymeric core and an outer polymeric sheath, wherein said core incorporates units of a reactive amphiphile having a cloud point, said units of reactive amphiphile being substantially hydrated, and wherein at least a portion of said sheath comprises polymerised hydrophilic monomers, said dispersion exhibiting temperature dependent viscosity.

25. An aqueous dispersion of water insoluble heteropolymer particles, wherein said heteropolymer particles incorporate units of hydrophilic ionizable monomers and reactive amphiphile throughout the particles.

26. An aqueous dispersion of water insoluble particles prepared in accordance with the process of claim 1.

27. Paints, binders or thickeners for paints, adhesives, textile coatings, carpet backings or construction materials comprising an aqueous dispersion of polymeric particles according to any one of claims 24 to 26.

* * * * *